United States Patent
Fink

[19]

[11] Patent Number: 5,524,353
[45] Date of Patent: Jun. 11, 1996

[54] SIDING LEVELING DEVICE

[76] Inventor: George Fink, 617 Good Hope Rd., Mechanicsburg, Pa. 17055

[21] Appl. No.: 429,358

[22] Filed: Apr. 26, 1995

[51] Int. Cl.⁶ .................... B43L 7/10; G01C 9/00
[52] U.S. Cl. .................. 33/451; 33/452; 33/456; 33/538
[58] Field of Search ............... 33/451, 452, 456, 33/459, 526, 529, 534, 535, 538, 114, 474, 475, 478, 418, 420, 465

[56] References Cited

U.S. PATENT DOCUMENTS

| | | | |
|---|---|---|---|
| 509,292 | 11/1893 | Bretz | 33/451 |
| 513,665 | 1/1894 | Barberie | 33/474 |
| 1,014,402 | 1/1912 | Larsen | 33/465 |
| 1,229,356 | 6/1917 | Watkins . | |
| 1,501,814 | 7/1924 | Scofield . | |
| 1,545,932 | 7/1925 | Williams . | |
| 2,435,799 | 2/1948 | Rizor | 33/474 |
| 3,057,250 | 10/1962 | Griffith . | |
| 3,670,418 | 6/1972 | Hamilton, Jr. | 33/534 |
| 3,832,782 | 9/1974 | Johnson et al. . | |
| 4,413,419 | 11/1983 | Venuso | 33/459 |
| 4,473,957 | 10/1984 | Faulkner . | |
| 4,955,141 | 9/1990 | Welch | 33/451 |
| 5,119,565 | 6/1992 | Horvath et al. | 33/451 |
| 5,174,034 | 12/1992 | Swanda | 33/356 |
| 5,207,004 | 5/1993 | Gruetzmacher | 33/379 |
| 5,255,443 | 10/1993 | Schmidt | 33/373 |

*Primary Examiner*—Christopher W. Fulton
*Attorney, Agent, or Firm*—Thomas Hooker

[57] ABSTRACT

A leveling device for extending a course of siding around an interior or exterior building corner includes a center link and two elongate planar arms pivotedly attached to the link. The arms are provided with alignment edges for fitting under edges of siding and aligning the siding on the building. Recesses are provided in the arms adjacent the length and a pocket is provided in the link between the hinges. The recesses and pocket space the device from a corner molding secured to the building prior to attaching siding.

9 Claims, 3 Drawing Sheets

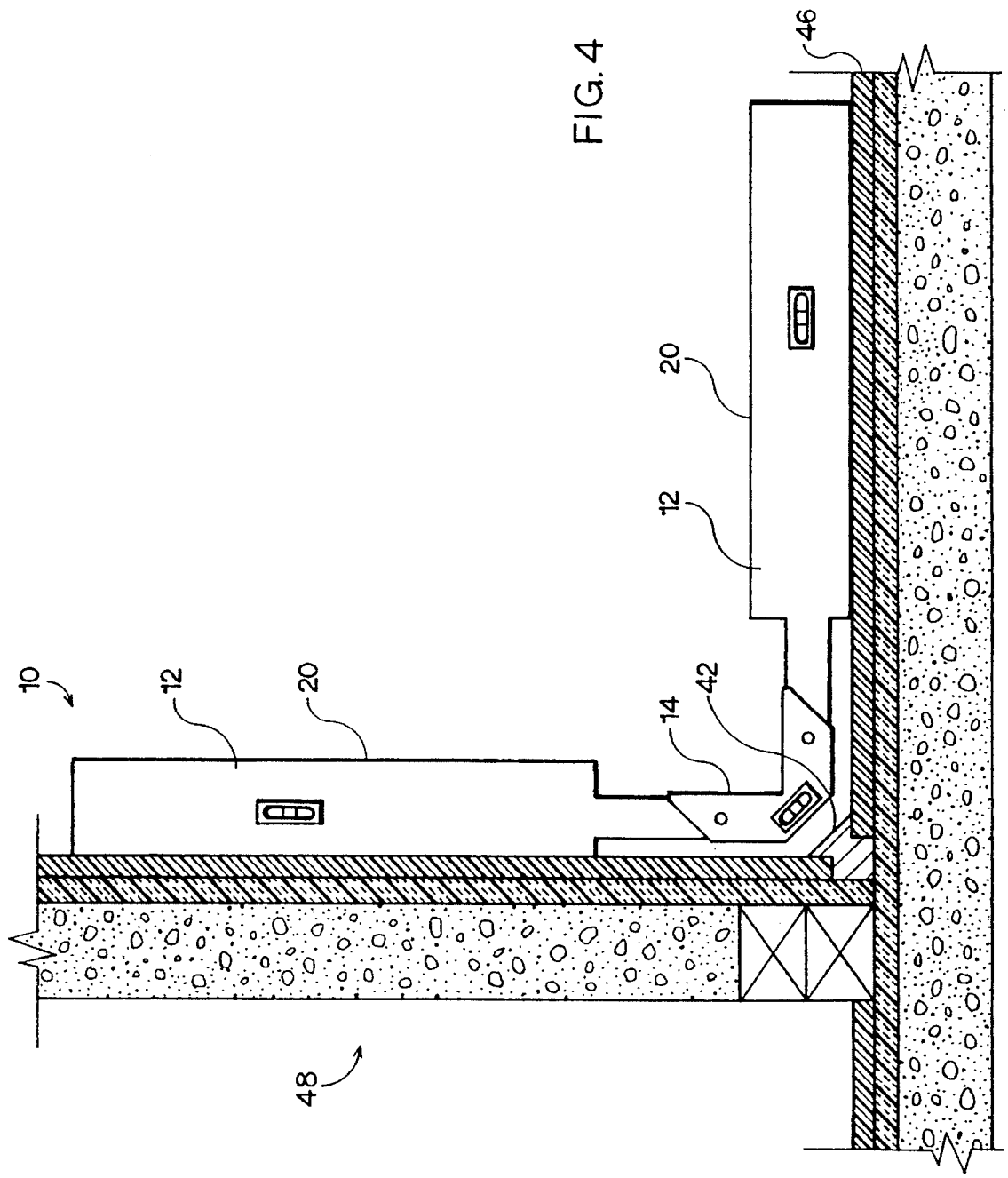

5,524,353

SIDING LEVELING DEVICE

FIELD OF THE INVENTION

The invention relates to a device useful in leveling lengths of siding carried around interior and exterior building corner.

DESCRIPTION OF THE PRIOR ART

Lengths of siding are attached to buildings, conventionally by nailing, starting at the bottom of the building and the working upward to the top of the building. The siding, whether made of wood, aluminum, or vinyl, conventionally has a lower drip lip that protrudes outwardly from the building and is used to level each siding length. It is desirable to carry a length of siding around the corner of a building at a constant level. This greatly improves the aesthetic appearance of the building.

Conventionally, siding is attached to buildings by first mounting vertical interior or exterior corner molding as required. The corner molding has recesses on both sides of the corner for receiving the ends of lengths of siding. These moldings, however, of necessity extend outwardly from the sides of the building a distance sufficient to make it difficult to assure that the length of siding on one side of the corner is exactly level or true with a length of siding on the other side of the corner.

Lengths of siding are conventionally leveled by placing an elongate carpenter's level against the lower drip edge and orienting the length of siding until the drip edge is horizontal. Carpenter levels cannot be used to level lengths of siding around corners.

SUMMARY OF THE INVENTION

The invention is a siding leveling device including a pair of arms which can be folded to fit around interior and exterior building corners and used to level the ends of siding installed around the corners. The device includes a level to maintain the arms level. In this way, a level siding may be installed up to a corner and fitted in a recess in a corner molding. One arm of the device is held against the lower edge of the siding. The other arm of the device is fitted around the corner molding and is held in place level to serve as a guide for mounting another length of molding continuing the course of siding around the corner. The arms of the device are pivotedly joined together to fold up the device for storage when not in use and fit siding around corners where the walls are joined at angles other than 90 degrees. The ends of the arms adjacent the hinge are recessed so that the level fits freely around corner molding.

Other objects and features of the invention will become apparent as the description proceeds, especially when taken in conjunction with the accompanying drawings illustrating the invention, of which there are two sheets and one embodiment.

DESCRIPTION OF THE DRAWINGS

FIG. 4 is a horizontal sectional view showing use of the device to level siding at an interior corner,

Figure 1:
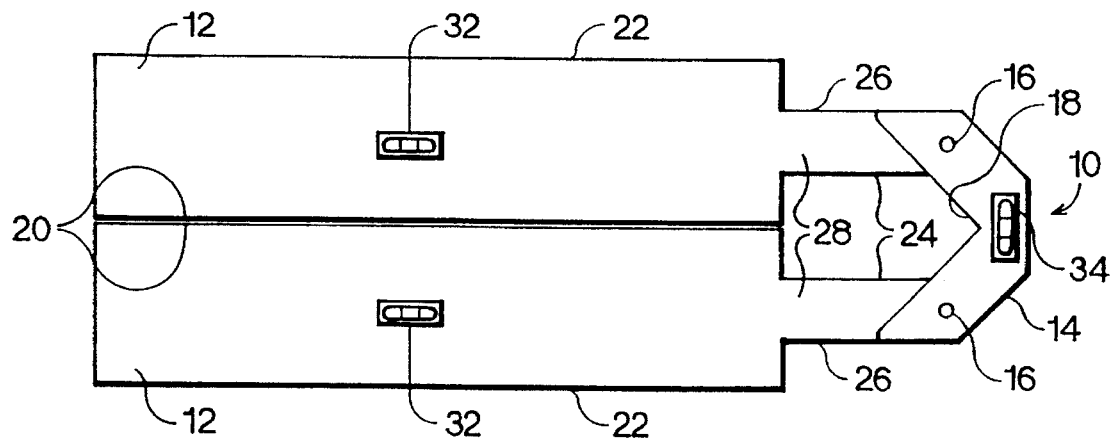
FIG. 1 is a top view of the device with the arms in the closed position.

DESCRIPTION OF THE PREFERRED EMBODIMENT construction siding leveling device 10 includes a pair of elongate flat co-planar arms 12 joined to center link 14 by pin hinges 16. The axis of hinges 16 are perpendicular to the plane of arms 12 to maintain the arms co-planar. Center link 14 includes a pocket 18 extending beyond the hinges 16 as shown in FIG. 1. Each arm 12 has opposed parallel edges 20 and 22 extending away from the hinge 16 joining the arm to the center link 14. When the arms are closed as shown in FIG. 1, edges 20 abut each other.

Figure 2:
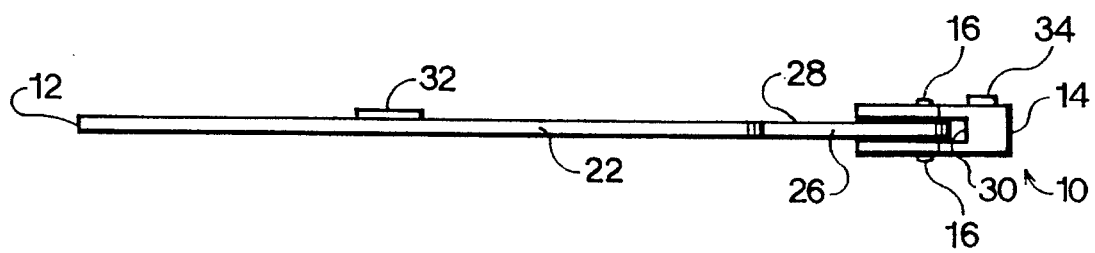
FIG. 2 is a side view of FIG. 1.

Recesses 24 are formed in edges 20 adjacent link 14. Recesses 26 are formed in edges 22 adjacent link 14. The recesses 24 and 26 define reduced width fingers 28 located between edges 20 and 22 of each arm 12. The fingers 28 extend into slots 30 formed in the link at the hinges 16 as shown in FIG. 2. Hinges 16 include pins extending through the center link above and below the slot and through the fingers 28 in the slot. A carpenter's bubble level 32 is mounted on the upper surface of each arm 12, extending longitudinally along the arm. Another carpenter's level 34 is mounted on link 14 extending transversely to the two hinges 16. Bull's eye levels, or other types of levels, may be used.

Figure 3:
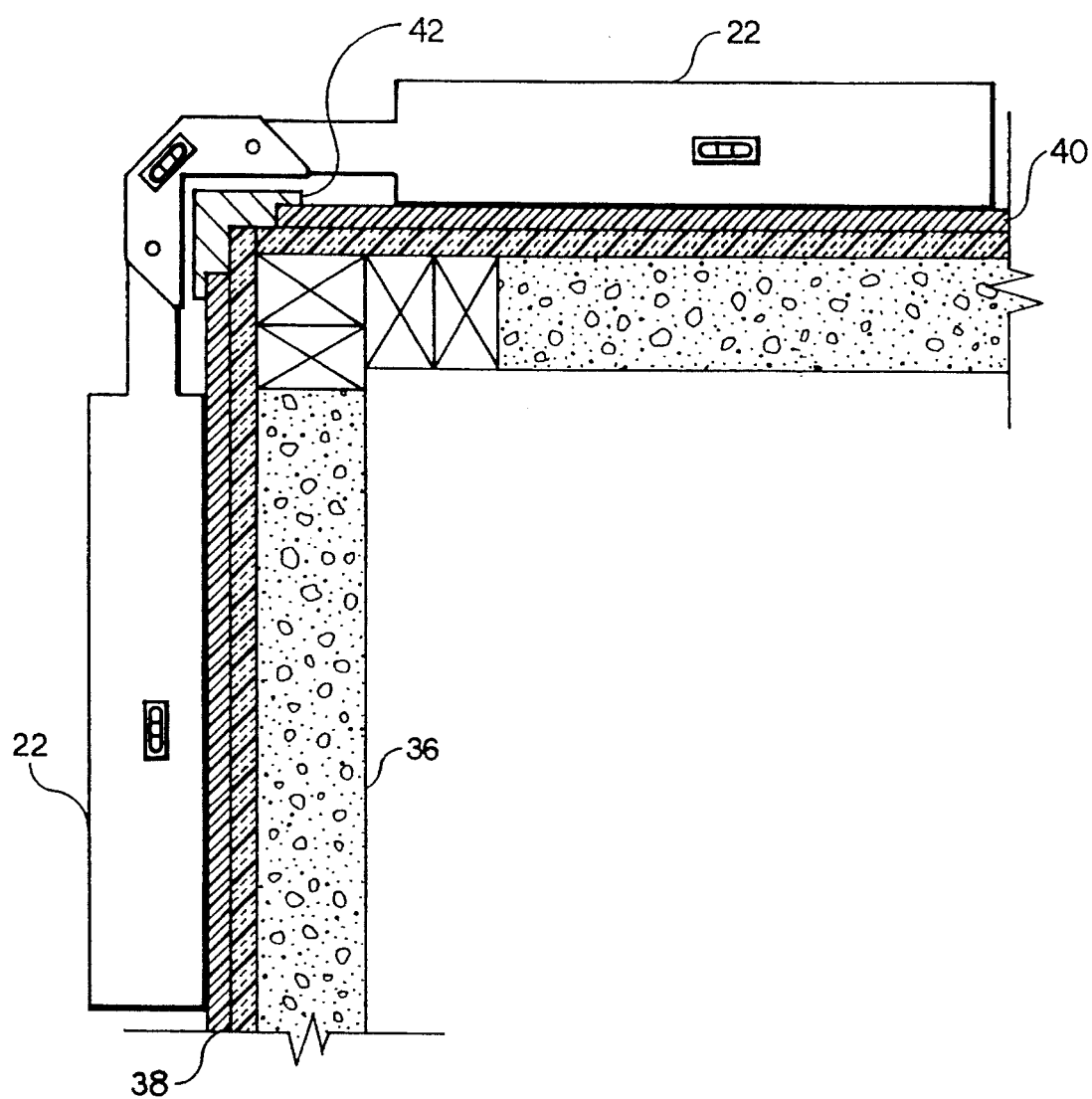
FIG. 3 is a horizontal sectional view showing use of the device to level siding at an exterior corner.

FIG. 3 is a horizontal sectional view through a building 36 at an exterior 90 degree corner. A length of siding 38 extends horizontally along one side of the building to the corner and is fitted in a recess in corner molding 42. A second length of siding 40 extends along the other side of the building to the corner and fits in another recess in molding 42.

The vertical box molding 42 is mounted on the corner of the building prior to attachment of the siding. A first length of siding 38 is then fitted in the recess in the box molding, leveled and attached to the building, conventionally by nailing. Then, device 10 is opened as illustrated and fitted under the lower lip edge of the siding 38 and around the corner. The vertical box molding 42 fits within the pocket 18 and recesses 24 to facilitate moving the other arm 12 around the corner and against the side of the building away from siding 38. Then, a length of siding 40 is fitted into the second recess in molding 42. The arms and center are held in a horizontal plane using the levels 32 and 34. Siding 40 is then rested on the adjacent arm 12 and is in proper horizontal alignment with siding 38 so that the course of siding has been carried accurately around the exterior corner of the building.

FIG. 4 illustrates device 10 open in the same position as shown in FIG. 3 and fitted in an interior 90 degree building corner. Lengths of siding 44 and 46 attached to the adjacent building walls and extending into recesses in pre-attached vertical interior corner molding 42. A course of molding panels is carried around the corner by first positioning one length of siding against one of the walls with the end of the length of siding extending into one of the recesses in molding 42. The length of siding is leveled and attached to the wall. Next, a second length of siding is positioned on the adjacent wall with an end extending into the second recess in the corner molding. Device 10 is then positioned as shown in FIG. 4 under the lip edge of the first molding and is held horizontal, using the bubble levels, to accurately align the length of siding on the adjacent wall. Once aligned, the siding is then attached to the walls and the course of siding has been accurately carried around the corner.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A leveling device for aligning siding around a corner of a building, the device comprising a pair of elongate arms having ends, a hinge connection joining first ends of the arms to permit rotary movement of the arms toward and away from each other, a level on the device, each arm including a first alignment edge extending along the length of the arm and facing the first alignment edge of the other arm and a recess in the first alignment edge adjacent the hinge connection, and a second alignment edge extending along the length of the arm parallel to the first alignment edge and a second recess in the second alignment edge adjacent the hinge connection.

2. A device as in claim 1 wherein said hinge connection includes a center link and a pair of spaced apart hinges between the link and the arms.

3. A device as in claim 2 including a pocket in the center link between said hinges.

4. A device as in claim 2 including a level on each arm.

5. A device as in claim 4 wherein said arms are flat and coplanar.

6. A device as in claim 5 wherein said device has a closed position where the first edges abut each other.

7. A device as in claim 1 wherein said alignment edges are coplanar.

8. A leveling device for aligning siding around a corner of a building, the device including a pair of elongate planar arms having opposed parallel edges extending along the lengths of the arms, a center link, a pair of hinges, each hinge joining one end of one arm to said center link, said hinges being spaced apart on said link, said center link including a pocket between said hinges, a pair of edge recesses on each arm, each recess located between the hinge joining the arm to the center link and an arm edge, and a level on the device.

9. A device as in claim 8 wherein all of said edges are coplanar.

* * * * *